No. 819,121. PATENTED MAY 1, 1906.
J. CARTER.
HOLDING AND GRIPPING PLIERS.
APPLICATION FILED JAN. 18, 1906.
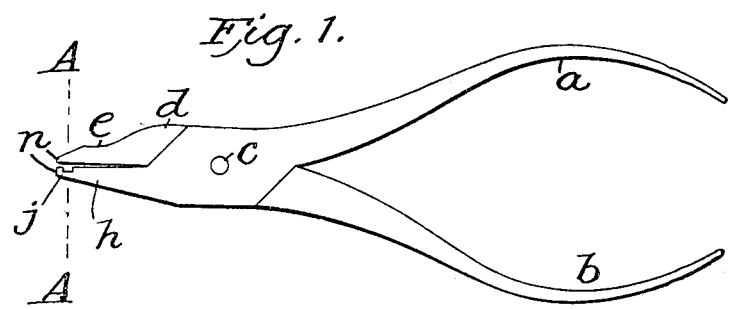
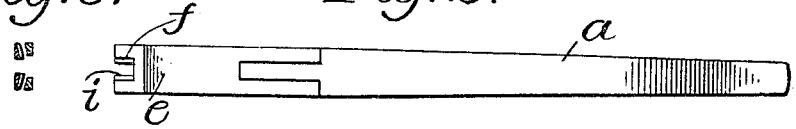
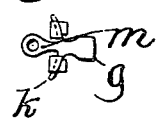
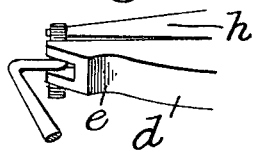
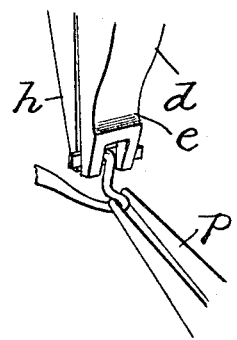
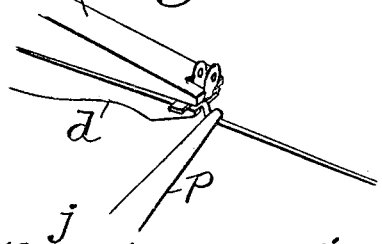
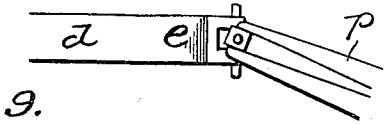
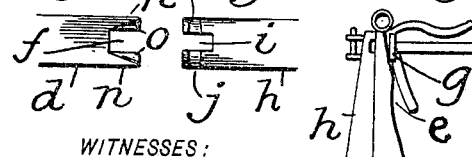
WITNESSES:
James F. Duhamel
M. Hamilton
INVENTOR
John Carter
BY
James Hamilton
ATTORNEY

UNITED STATES PATENT OFFICE.

JOHN CARTER, OF MALDEN, MASSACHUSETTS, ASSIGNOR TO GLOBE OPTICAL COMPANY, OF BOSTON, MASSACHUSETTS, A CORPORATION OF MASSACHUSETTS.

HOLDING AND GRIPPING PLIERS.

No. 819,121.  Specification of Letters Patent.  Patented May 1, 1906.

Application filed January 18, 1906. Serial No. 296,597.

*To all whom it may concern:*

Be it known that I, JOHN CARTER, a citizen of the United States, residing at Malden, in the county of Middlesex and Commonwealth of Massachusetts, have invented certain new and useful Improvements in Holding and Gripping Pliers, of which the following is a specification, reference being had to the accompanying drawings.

My invention relates to pliers for holding and gripping objects; and the object of my invention is to provide a pliers of this class adapted especially for use in optical work in the assembling and adjusting of eyeglasses and spectacles.

My new pliers are especially adapted for gripping and holding that portion of an eyeglass or spectacle frame known as the "strap," which comprises two principal parts—to wit., a pair of coöperating lugs or ears between which the lens is held by a screw passing from one ear to the other and a curved member from which these ears project and which holds the lens from tilting on its screw. The part of the frame which holds the nose-guards and the spring is called the "box," while the strap and the box together comprise the "stud."

With the pliers now in common use the curved part of the strap is straightened in performing the various operations necessary to the assembling and adjusting of the parts of the completed spectacles or eyeglasses, and it becomes necessary to restore the curved part of the strap to its original shape. To accomplish this restoration requires much skill and the expenditure of considerable time. Moreover, the bending and rebending mars the stock. By using my new pliers the curved part of the strap is maintained in its original shape and the unskilled workman can make the necessary changes. At the same time the stock is kept as good as new and much time is saved.

In the drawings illustrating the principle of my invention and the best mode now known to me of applying that principle, Figure 1 is a side elevation of my new pliers. Fig. 2 is a plan view thereof. Fig. 3 is a sectional view on line A A, Fig. 1. Fig. 4 is an end view of my pliers holding a stud by gripping the curved member of the strap. Fig. 5 is a perspective view of my pliers holding the bridge of a pair of spectacles by gripping the curved member of the strap. Figs. 6, 7, 8, and 9 show the pliers in use in various operations. Fig. 10 is an elevation of the inner face of the upper jaw of the pliers, and Fig. 11 is a similar view of the inner face of the lower jaw.

The pliers have the usual arms *a b*, pivoted at *c* and serving as handles. To permit freedom of movement of the frame under adjustment, the upper jaw *d* is formed on its upper face directly in rear of its nose end with a depression or concaved portion *e*, and to permit the free passage of the box *g* said jaw *d* is longitudinally slotted at *f*. This slot *f* is wide enough to allow the free manipulation of the end of a screw-driver therein. (See Fig. 10.) The lower jaw *h* is similarly slotted at *i*; but the slot is of less width than the slot *f*. (See Figs. 2, 10, and 11.) Near the extremity of the lower jaw and across its inner face (see Fig. 11) extends a transverse groove *j*, adapted to receive the curved part *k* of a strap, the ears or wings *m* passing through the slot *i* and the box *g* passing through the slot *f* of the upper jaw *d*, Fig. 4. The inner faces of the prongs *n* of the upper jaw *d* are slightly concaved to fit over the convex surface of the curved member *k*, as shown at *o*, Fig. 10. The inner faces of the jaws coöperate to hold the curved member *k* rigidly and without deformation during the assembling and adjustment of the parts of the eyeglasses or spectacles.

In Figs. 6 and 7 my new pliers are shown in the operation of holding parts of a spectacle-frame, while a common pliers *p* is used to make the adjustments. In Fig. 6 the operation illustrated is that of bending a shank of a bridge, while in Fig. 7 the positions illustrated are those taken in making a temple angular.

In Figs. 8 and 9 the part under adjustment is the stud of an eyeglass. In Fig. 8 the operation of making a stud angular is illustrated, while in Fig. 9 that of tightening a center is depicted.

What I claim is—

1. Holding and gripping pliers for opticians' use comprising a pair of coöperating longitudinally-slotted jaws; the outer upper face of one of said jaws being formed directly in rear of its nose end with a depression to permit the free movement of the frame under operation and the inner face of the other of said jaws being formed with a transverse groove adapted to receive the curved lens-holding part of a strap.

2. Holding and gripping pliers for opticians' use comprising a pair of coöperating longitudinally-slotted jaws; the inner face of one jaw being formed with a groove adapted to receive the curved lens-holding part of a strap and the opposed inner face of the other jaw being concaved to fit over said lens-holding part.

3. Holding and gripping pliers for opticians' use comprising a pair of coöperating jaws; one of said jaws being formed with an aperture and with a transverse groove on its inner face and extending from the side walls of said aperture to the outer edges of said face, said transverse groove deepening from said side walls to the outer edges of said face, whereby said pliers are adapted to hold without deformation the curved lens-holding part of a strap.

In testimony whereof I hereunto set my hand, this 16th day of January, 1906, at said Boston.

JOHN CARTER.

Witnesses:
WILLIAM F. SIDELINGER,
F. D. FULLER.